Jan. 19, 1937.                H. L. WARD                2,068,361
                METHOD OF WORKING MOLDABLE MATERIAL
                         Filed June 9, 1933
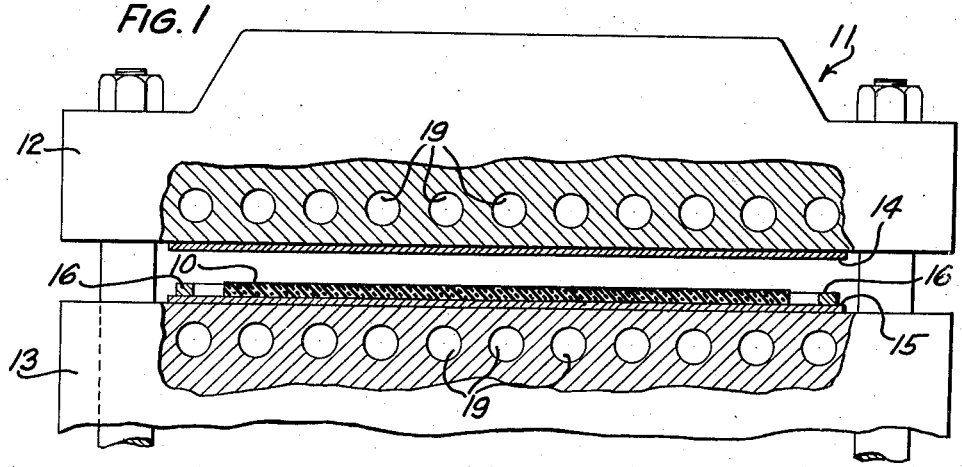
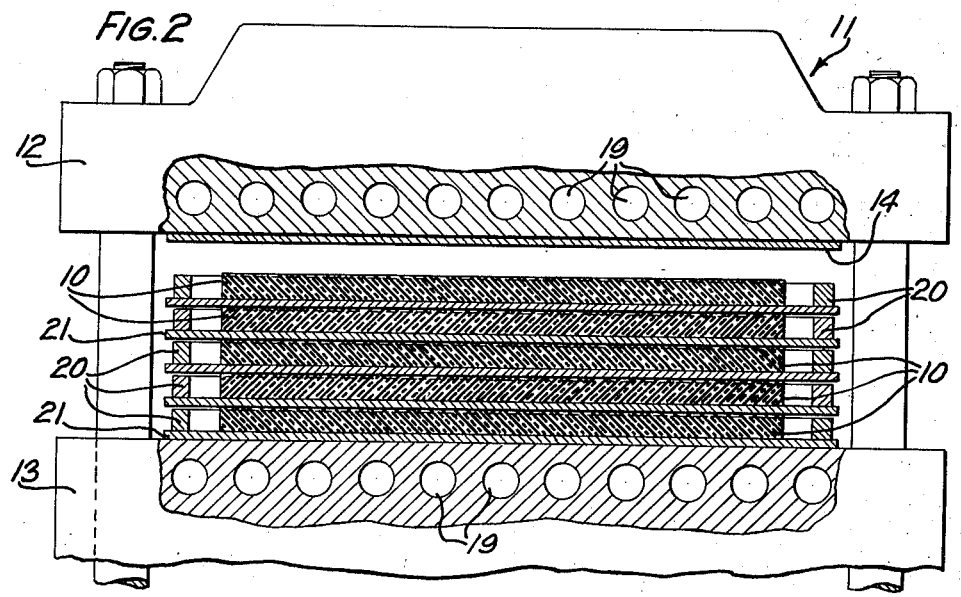
INVENTOR
H. L. WARD
BY H. A. Whitehorn
ATTORNEY Patented Jan. 19, 1937

2,068,361

UNITED STATES PATENT OFFICE 2,068,361

METHOD OF WORKING MOLDABLE MATERIAL

Henry L. Ward, Chicago, Ill., assignor to Western Electric Company, Incorporated, New York, N. Y., a corporation of New York Application June 9, 1933, Serial No. 675,020

3 Claims. (Cl. 18—55)

This invention relates to methods of working moldable material, and particularly to methods of forming articles of heat curable material to predetermined shapes and sizes and/or uniform thicknesses.

The invention is particularly adapted to be employed in manufacturing vulcanized hard rubber sheets of predetermined and uniform thicknesses. Heretofore, in some instances, it has been the practice in manufacturing such sheets to thoroughly mix the rubber ingredients in suitable proportions into a plastic mass and thereafter roll the mass into a sheet between calendering rolls, the sheet being rolled with a substantial over-thickness from the thickness desired in the finished vulcanized hard rubber sheet. The unvulcanized rubber sheet is then placed in a vulcanizer and subjected to heat to completely cure or vulcanize it into a hard rubber sheet, which is then cooled, the thickness of the sheet after cooling still being substantially oversize. Due to the shrinkage encountered in cooling the sheet, after vulcanization, which is apparently variable, it varying with the rubber ingredients and other factors, such shrinkage cannot be accurately predetermined, and it is therefore difficult to maintain desired dimensional tolerances in commercial practice. Furthermore, the vulcanized sheet after the cooling thereof is apt to be wavy due to unequal shrinkage. The wavy and still over-thick vulcanized sheet is then reduced, by milling, lapping or grinding the surfaces thereof, to the desired thicknesses. This has been found to be somewhat expensive and at the same time, in some instances, an unsatisfactory method in that it is difficult to uniformly reduce the over-thickness of the sheet the desired amount throughout its entire area. It has also been the practice, in some cases, heretofore to make articles of various shapes of hard rubber or similar heat curable materials by placing the uncured material in a mold of substantially the desired size and shape and curing the material in the mold.

An object of this invention is to provide an improved method of forming articles of heat curable material to predetermined shapes and sizes and/or uniform thicknesses.

In accordance with one embodiment of this invention, a vulcanized hard rubber sheet, which may be manufactured in accordance with common practice, and of a thickness which is substantially oversize compared to the desired thickness thereof, is placed, after complete vulcanization and cooling, preferably in an oven where it is heated to a suitable degree to soften it, and while heated is placed in a press and subjected to pressure to reduce the thickness thereof a definite desired amount as determined by a positive stop on the press, the reduced sheet being cooled during a portion of or simultaneously with the entire pressing action or subsequent thereto, while under pressure. In an alternative method the sheet instead of being heated in an oven may be heated in the press to soften it either before or during the time it is being subjected to pressure. The application of heat to the sheet from the heated press may continue during the pressing action, the sheet being subsequently cooled while under pressure or the heated sheet may be cooled beginning with or during the pressing action.

Other features and advantages of the invention will become apparent from the following detailed description, taken in connection with the accompanying drawing, illustrating apparatus by means of which certain steps of the method may be practiced, in which Fig. 1 is a fragmentary elevation view, partly in section, of a press shown equipped for forming a single sheet, and Fig. 2 is a view similar to Fig. 1 illustrating a press equipped for simultaneously forming a plurality of sheets.

One method illustrated by the drawing for manufacturing vulcanized hard rubber sheets of predetermined and uniform thicknesses may be carried out by first forming a vulcanized hard rubber sheet in accordance with the usual practice up to and including the steps of vulcanizing and cooling. Preferably the oversize vulcanized hard rubber sheet to be reduced to a predetermined and uniform thickness and before the application of pressure thereto is placed in an appropriate oven or the like (not shown) where it is heated to a suitable degree to soften it. The oversized sheet while heated, indicated in the drawing at 10 (Fig. 1), is then placed in a press 11, fragmentarily illustrated in the drawing, comprising a stationary upper platen 12 and a movable lower platen 13.

Upon the opposed horizontal surfaces of the platens 12 and 13 are fixed plates 14 and 15, respectively, the opposed horizontal surfaces of the plates 14 and 15 being parallelly arranged and presenting smooth outer surfaces to insure that the vulcanized sheet 10 placed therebetween will be reduced throughout its area a uniform amount as determined by a positive stop member 16 secured to the lower plate 15, the stop member 16 extending completely around the sheet of rubber. The height of the stop member 16 above the upper surface of the plate 15 is equal to the desired thickness to which the sheet 10 is to be reduced, and it will be observed that the vulcanized sheet 10 to be reduced in thickness extends above the stop member.

The platens 12 and 13 are provided with channels 19 through which suitable cooling and heating agents such as cold water and steam may be supplied. The channels 19 are so arranged in the platens 12 and 13 that the effect of the cooling and heating agents in the channels is uniformly distributed to the opposed horizontal surfaces of the plates 14 and 15 between which surfaces the vulcanized sheet 10 of hard rubber is treated.

In the preferred method, as hereinbefore described, the sheet 10 is heated in an oven or the like (not shown) to the desired extent. The temperature to which the sheet 10 need be heated will vary somewhat with the particular composition of the rubber and with the pressure which is to be used, but it will in general be less than the temperatures normally used in vulcanizing hard rubber and 250° F. has been found to be satisfactory. When the sheet 10 has been heated, as just mentioned, it is unnecessary to apply a heating medium to the press through the channels 19, but when the sheet has been reduced to its predetermined thickness the channels are connected to a cold water supply. As an alternative the press may be continuously cooled rather than intermittently. Immediately upon the heated vulcanized sheet 10 being placed in the press upon the plate 15 of the lower platen 13 the latter is moved upwardly, and the sheet is subjected to a heavy pressure between the plates 14 and 15 of the platens 12 and 13, respectively, the upward movement of the platen 13 continuing until the stop member 16 engages the lower surface of the plate 14 of the platen 12. In general the pressure required will not need to exceed 2000 pounds per square inch. It will be understood that although the previously heated and softened sheet 10 is preferably placed in an unheated press, in some instances, it may be desirable to insert the heated and softened sheet in a heated press which is later cooled by cold water entered in the channels 19, the water being connected to the channels during a portion of the pressing period or during the entire period, or upon completion of the pressing period. Also unheated sheets may be placed in a heated press, the steam being applied until the desired temperature is attained for softening the sheet and the pressure then applied, or the steam may be applied either before or during the application of pressure to the sheet.

The vulcanized oversize sheet 10 is thus subjected to the simultaneous action of heat and pressure, the degree of heat applied being just sufficient to cause a slow flow of the rubber during the pressing action, which causes the excess thickness to be reduced as determined by the positive stop member 16 engaging the upper platen plate 14. The pressure of the press upon the sheet 10 is maintained for a sufficient time to permit the effect of the cold water transmitted to the sheet from the channels 19, which are connected to the cold water supply upon the sheet being reduced, to thoroughly cool and harden it and thereafter the press is opened and the sheet which has been reduced to a predetermined and uniform thickness removed. Any shrinkage of the reduced sheet 10 during the cooling and hardening thereof, which will be very slight, may be compensated for, if necessary, by allowing for it in the thickness of the stop member 16.

Fig. 2 illustrates fragmentarily apparatus for practicing the improved method when used for simultaneously reducing a plurality of vulcanized hard rubber sheets 10 to the desired thicknesses. As shown in the drawing the sheets 10 are stacked in the press 11 between the movable lower platen 13 and the stationary upper platen 12 in interleaving arrangement with a plurality of positive stop members 20 which extend completely around the sheets. Integrally united to the lower surface of each of the stop members 20 is a plate 21 having smooth outer surfaces abutting the sheets arranged above and below the same. It is to be understood that the plates 21 are of a thickness which will withstand the pressure imparted thereto in the operation of the press to reduce the sheets to the desired thicknesses without deformation. The operation of the press illustrated in Fig. 2 to simultaneously reduce the plurality of stacked sheets 10 is similar to the reduction of the single sheet hereinbefore described in connection with the press shown in Fig. 1. In operation the upward movement of the platen 13 continues until the upper surface of each of the stop members 20 engages the lower surface of the adjacent plate 21, at which time the lower surface of the plate 14 of the platen 12 will be in engagement with the upper surface of the uppermost stop member 20.

While the method of this invention has been disclosed and described in connection with sheets composed of rubber ingredients, it will be understood that the invention is capable of application to other types of articles composed of rubber ingredients or similar heat curable and moldable materials and is only limited by the scope of the appended claims.

What is claimed is:

1. The method of manufacturing vulcanized hard rubber sheets of predetermined thicknesses which comprises stacking a plurality of prevulcanized hard rubber sheets of an oversize thickness, subjecting the hard rubber sheets to heat, applying pressure thereto to reduce their thickness, and positively and individually stopping the application of pressure to the respective sheets.

2. The method of manufacturing vulcanized hard rubber sheets of predetermined thicknesses which comprises applying heat to a plurality of vulcanized hard rubber sheets of an oversize thickness to soften the same, stacking said sheets, applying pressure to said softened and stacked sheets to reduce their thickness, and positively and individually stopping the application of pressure to the respective sheets.

3. The method of manufacturing vulcanized hard rubber sheets of predetermined thicknesses which comprises applying heat to a plurality of vulcanized hard rubber sheets of an oversize thickness to soften the same, stacking said sheets, simultaneously applying uniformly distributed heat and pressure to said softened and stacked sheets to reduce their thickness, positively and individually stopping the application of pressure to the respective sheets, and then cooling the reduced sheets while under pressure.

HENRY L. WARD.